Oct. 14, 1958 A. W. KORB 2,855,639

MAGNETIC GASKET AND METHOD AND APPARATUS FOR MAKING SAME

Filed April 23, 1951 4 Sheets-Sheet 1

INVENTOR.
Anton W. Korb
BY
Thiess, Olson & Mecklenburger
Attys.

INVENTOR.
Anton W. Korb.
BY,
Thiess, Olson & Mecklenburger.
Attys.

Oct. 14, 1958 A. W. KORB 2,855,639

MAGNETIC GASKET AND METHOD AND APPARATUS FOR MAKING SAME

Filed April 23, 1951 4 Sheets-Sheet 3

INVENTOR.
Anton W. Korb.
BY.
Thiess, Olson & Mecklenburger
Att'ys.

Oct. 14, 1958 A. W. KORB 2,855,639

MAGNETIC GASKET AND METHOD AND APPARATUS FOR MAKING SAME

Filed April 23, 1951 4 Sheets-Sheet 4

INVENTOR.
Anton W. Korb.
BY.
Thiess, Olson & Mecklenburger.
Attys.

United States Patent Office 2,855,639

Patented Oct. 14, 1958

2,855,639

MAGNETIC GASKET AND METHOD AND APPARATUS FOR MAKING SAME

Anton W. Korb, Grandville, Mich., assignor to Jervis Corporation, Grandville, Mich., a corporation of Michigan Application April 23, 1951, Serial No. 222,328

7 Claims. (Cl. 20—69)

This invention relates to an improved magnetic gasket and a method and apparatus for facilitating the formation of the same. It is an object of the invention to provide an improved gasket and an improved method and apparatus of that character.

Magnetic gaskets such as those disclosed and claimed in Patents Nos. 2,446,336, 2,471,634 and 2,471,635, issued to Vennice E. Mark and Lloyd L. Anderson, all assigned to the same assignee as the present invention, have certain substantial advantages over a gasket which is merely compressed between two members such as a door and a door jamb of a refrigerator to seal the joint therebetween. A magnetic gasket may be particularly effective where the magnetically attractable portion of the gasket is flexibly movable away from the member, for example a refrigerator door, on which it is mounted, such that this portion of the gasket tends to leap outwardly toward the door jamb when the door is nearly closed.

Where there are rather substantial irregularities in the surfaces between which the seal is intended to be effected, this arrangement is desirable as it facilitates proper sealing of the joint in spite of such irregularities. However, a refrigerator door gasket, for example, is frequently arranged to turn at substantially right angles at the corners of the door or door jamb. At such corners the otherwise flexibly movable longitudinally extending portion of the gasket is quite firmly secured in one position with respect to the member on which it is mounted as will subsequently be explained in detail. The corner portions of the gasket are therefore not free to leap out away from the door, for example, and toward the door jamb when the door approaches its closed position. Since the closed position of the door will be determined by those portions of the gasket which do spring out as the door approaches the door jamb, the corner portions of the gasket will fail to contact the door jamb, leaving small gaps through which air may pass. The failure to seal at the four corners of the gasket is particularly undesirable where the gasket is intended to seal the door of a refrigerator since the air which leaks around the corner portions of the gasket causes excessive frosting of the refrigerator coils and needless waste of refrigeration.

According to one embodiment of the invention, a magnetic gasket of the type discussed above is distorted near its corners to such effect that when the other portions of the gasket spring outwardly away from the refrigerator door, for example, and toward the door jamb as the door approaches its closed position, all portions of the sealing edge of the gasket lie substantially in a common plane. A seal is thereby effected at the corners of the door as well as at all points along the width and height of the door.

It is another object of the invention to provide an improved magnetic gasket which forms an effective seal between two relatively movable members.

It is another object of the invention to provide an improved magnetic gasket which extends continuously around substantially right angle corners and provides an effective seal at all points along its length.

It is another object of the invention to provide an improved magnetic gasket for sealing a joint between two relatively movable members, said gasket extending around a corner and having a magnetically attractable longitudinally extending sealing portion resiliently movable outwardly of the member on which the gasket is mounted and toward the other member under the influence of magnetic attraction, the corner portion of the gasket being deformed such that the sealing surface of the corner portion normally is disposed outwardly of the remainder of the sealing surface but lies in substantially the same plane therewith when the remainder of the sealing surface is so moved outwardly.

The apparatus forming a part of the invention includes, in one embodiment, a jig for holding such a gasket to facilitate the formation of corner sections or joints of the gasket which are distorted to the effect discussed above. It is another object of the invention to provide an improved method and apparatus for facilitating the formation of corners or corner joints in a magnetic gasket. It is another object of the invention to provide an improved method and apparatus for facilitating the formation of corner joints in a magnetic gasket, the corner portions of the gasket being distorted such that they lie substantially in the same plane as the remainder of the gasket when the latter is magnetically attracted outwardly of the member on which it is mounted. It is another object of the invention to provide an improved method and apparatus for facilitating the formation of corner joints in a magnetic gasket which are distorted relative to the remaining portion of the gasket to obtain an effective seal at such corners when the remainder of the gasket is drawn outwardly of the member upon which the gasket is mounted.

The invention, together with further objects and advantages thereof, will best be understood by reference to the following description taken in connection with the accompanying drawings, and its scope will be pointed out in the appended claims.

In the drawings, in which like parts are designated by like reference numerals,

Figure 1:
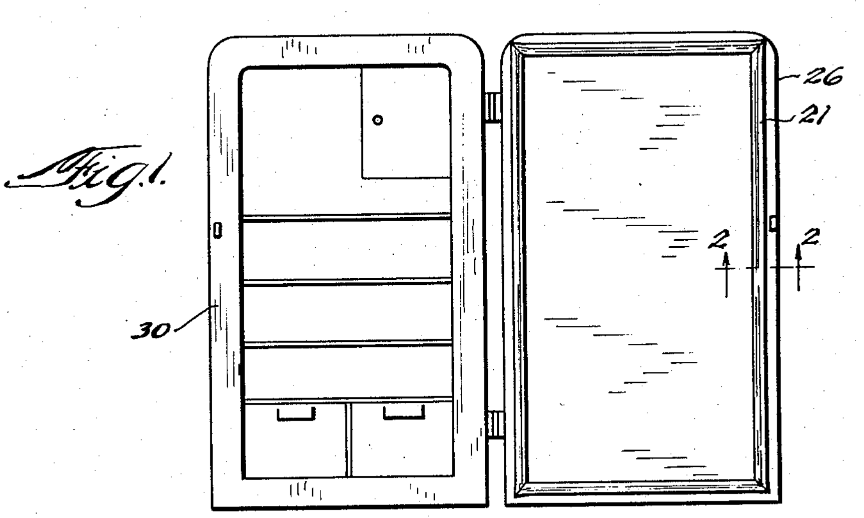
Fig. 1 is an elevational view of a refrigerator having a gasket, constructed in accordance with the invention, applied to the refrigerator door.
Figures 2, 2A, 3, 4, 5:
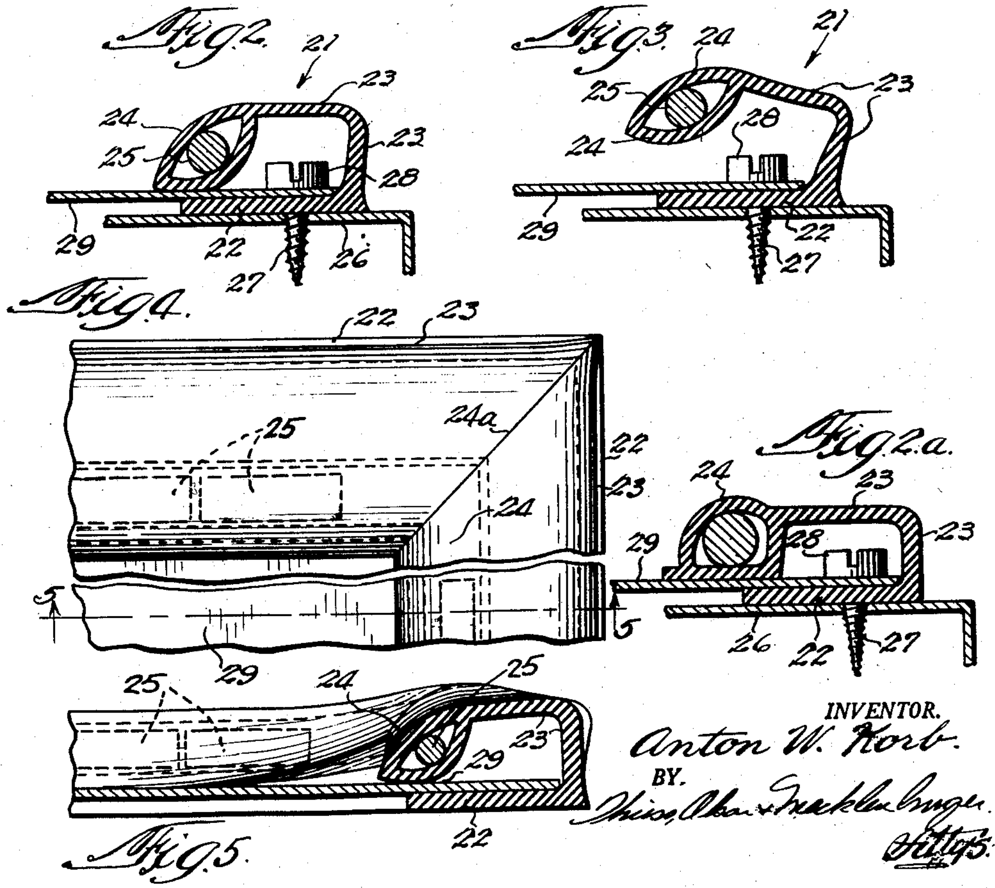
Fig. 2 is a greatly enlarged cross-sectional view of the same gasket taken along the line 2—2 of Fig. 1.
Figure 6:
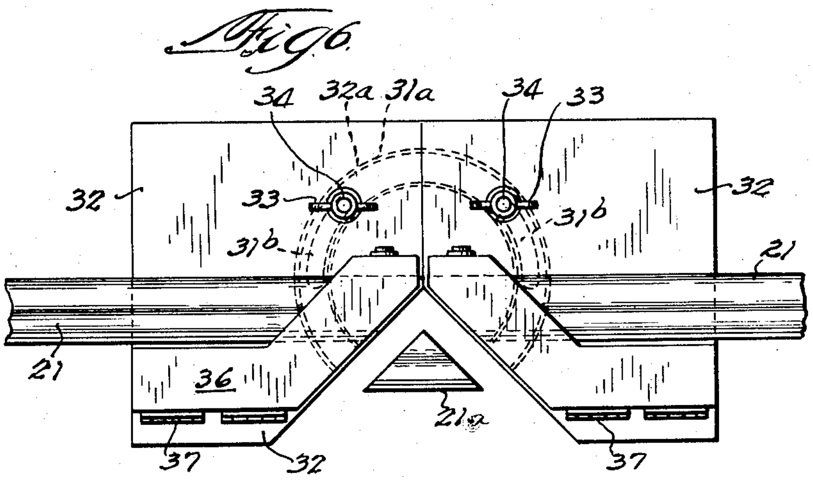
Figure 7:
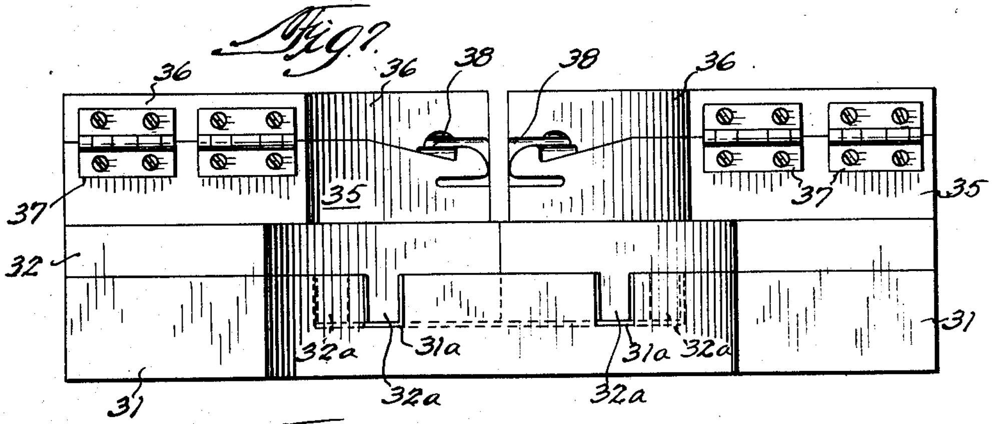
Figure 8:
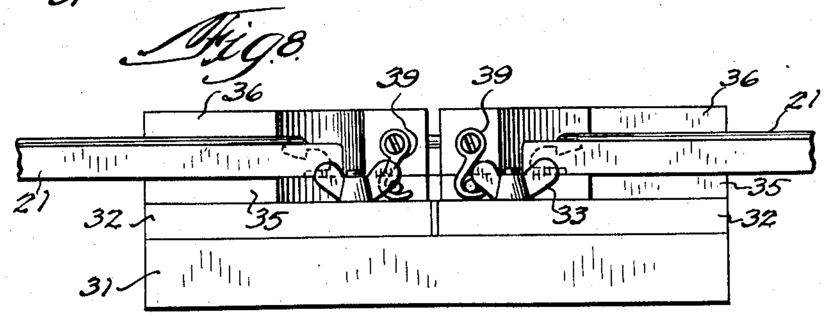
Figures 9, 10, 11, 12:
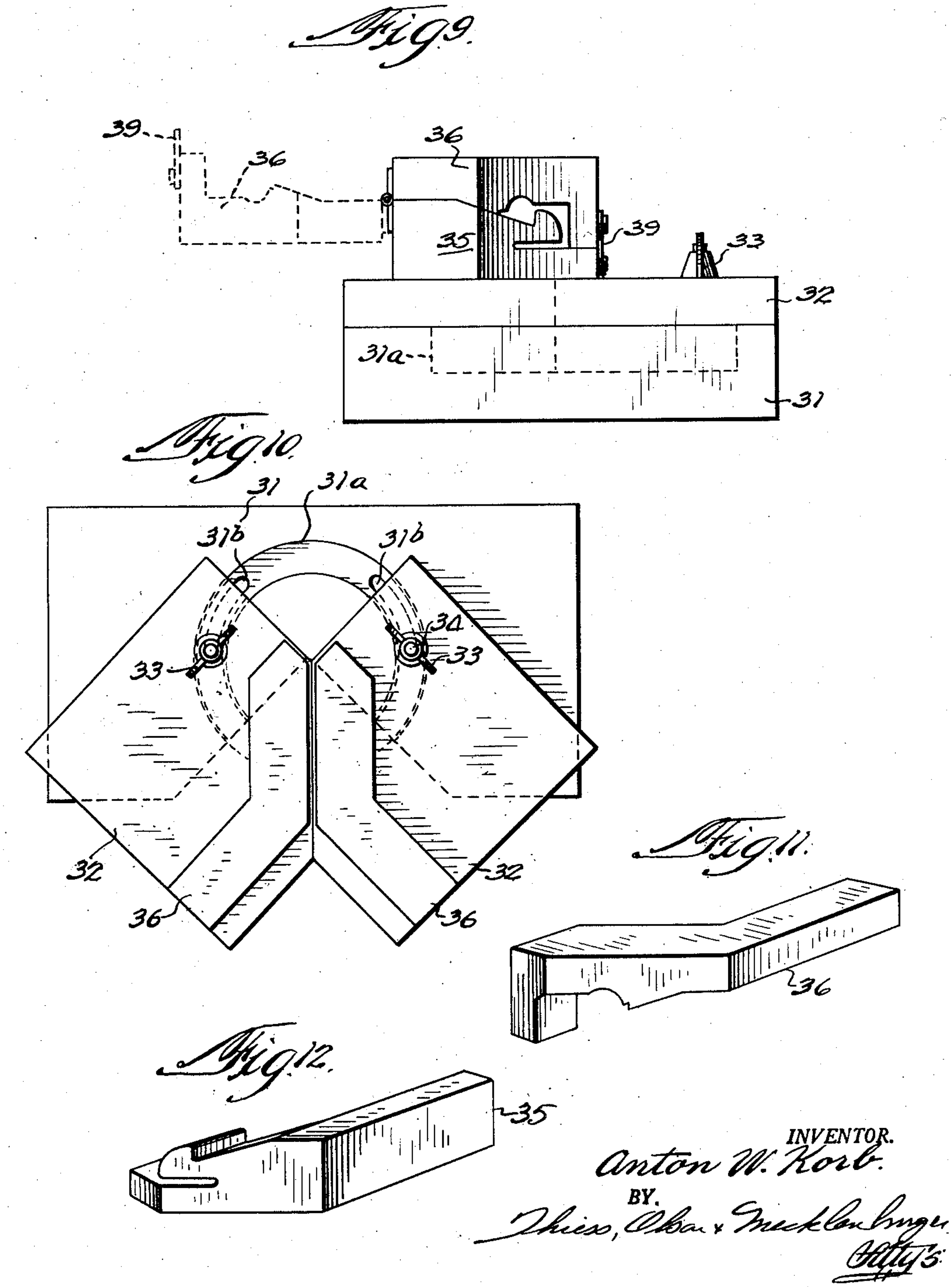
Figure 13:
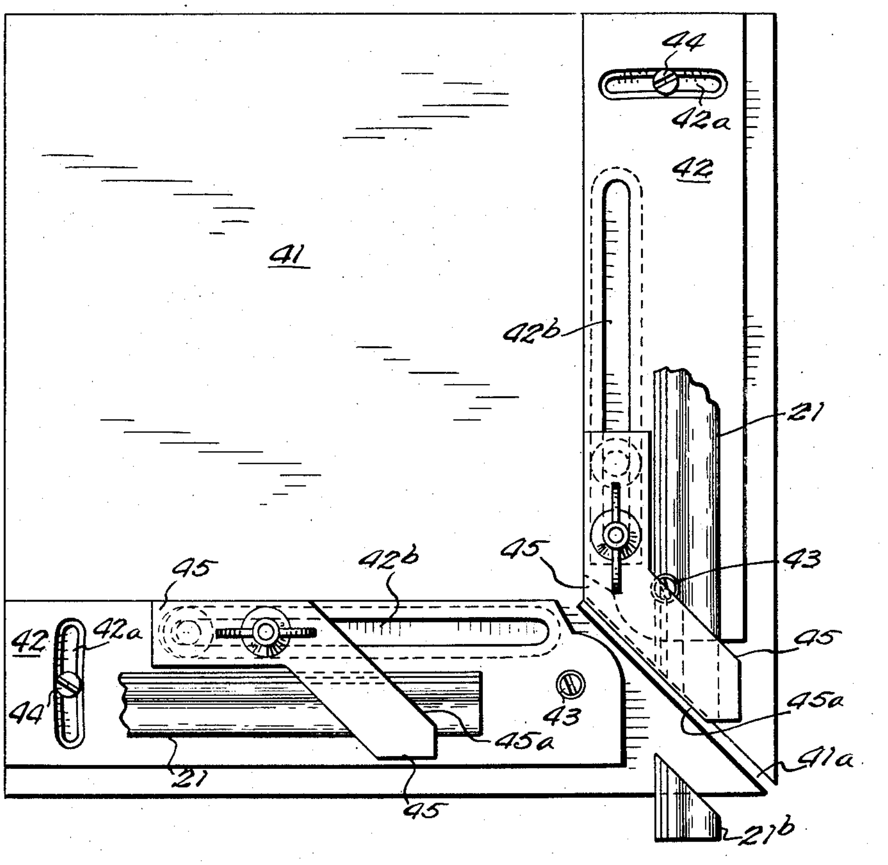
Figure 14:
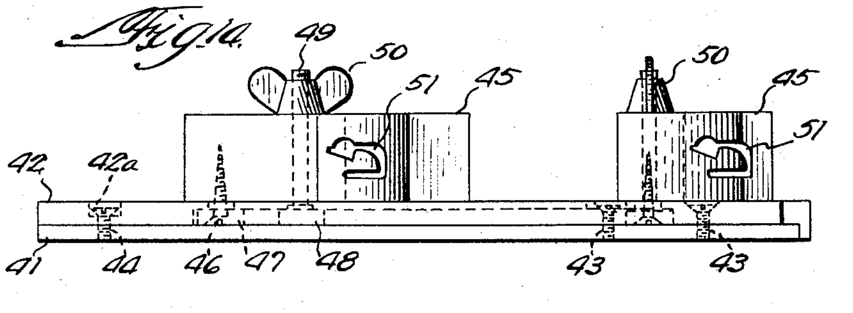

Fig. 2*a* is a view similar to Fig. 2 but showing another suitable form of gasket;

Fig. 3 is a cross-sectional view similar to Fig. 2, but showing the gasket in the position it assumes when the door of the refrigerator upon which it is mounted approaches its closed position;

Fig. 4 is an enlarged partial plan view of the same gasket, distorted at a corner portion in accordance with one feature of the invention;

Fig. 5 is a view of the same gasket taken along the line 5—5 of Fig. 4;

Fig. 6 is a plan view of a jig for forming corners in the gasket of Fig. 2*a* in accordance with the invention;

Fig. 7 is an enlarged front elevational view of the jig shown in Fig. 6;

Fig. 8 is a rear elevational view of the same jig;

Fig. 9 is an enlarged side elevational view of the same jig;

Fig. 10 is a plan view similar to Fig. 6, but showing the jig in a different operational position;

Fig. 11 is a detail perspective view of one member of the jig illustrated in Figs. 6 through 10;

Fig. 12 is a detail perspective view of another member of the jig illustrated in Figs. 6 through 10;

Fig. 13 is a plan view of a jig similar to that shown in Figs. 6 through 12 but simplified in construction; and, Fig. 14 is a front elevational view of the jig shown in Fig. 13.

The magnetic gasket which forms one feature of the invention is shown in the drawings applied to the door of a household refrigerator for sealing the joint between the regrigerator door and the door jamb. The gasket 21 of either Fig. 2 or 2*a* has a flange 22, a tubular portion 24 in which there is enclosed a series of bar magnets 25, and an interconnecting leg portion 23. The flange 22 of the gasket is tightly clamped between the refrigerator door 26 and a door panel 29 (extending substantially the entire width and height of the door and forming the inner wall thereof) by means of a plurality of screws 27, the heads 28 of the screws 27 being concealed by the gasket 21 in the interest of a neat appearance of the assembly.

The door frame 30 of the refrigerator is constructed of magnetic material or has magnetic material arranged immediately behind it such that when the door of the refrigerator is closed the magnets 25 are attracted thereto and effect a seal between the gasket and the door frame and hence between the refrigerator door and door frame.

The gasket 21 is preferably formed of a soft and flexible material such as rubber or a suitable plastic in order that the leg portion 23 may bend to permit movement of the tubular portion 24 of the gasket outwardly away from the refrigerator door to a position such as that indicated in Fig. 3. The normal position of the gasket 21 is that illustrated in Fig. 2, the material forming the leg portion 23 preferably being so biased that the tubular portion 24 is urged to press snugly against the surface of the door panel 29. However, when the door is in a nearly closed position, as for example when the door is being closed, the magnetic attraction between the magnets 25 and the door frame 30 causes the magnets and hence the tubular portion 24 of the gasket to leap outwardly away from the refrigerator door and toward the door frame. The gasket 21 is then in a position such as that illustrated in Fig. 3. This in itself is desirable since the flexibility of the leg portion 23 in combination with the attraction of the magnets 25 for the door frame 30 causes the surface of the tubular portion 24 of the gasket to adapt itself to irregularities in the surface of the door frame. This results in a better seal between the door and the door frame and thereby prevents the passage of air into or out of the refrigerator when the door is closed.

In a straight run of gasket the only deformation of the gasket required in its movement from the position shown in Fig. 2 to that illustrated in Fig. 3 is a bending of the leg portion 23, this portion being sufficiently flexible to permit such deformation under the influence of the magnetic attraction between the magnets 25 and the door frame 30 as suggested above. However, in the conventional gasket for a refrigerator and for many other applications, substantially right-angle turns are required at the corners of the door. In the vicinity of these corners a movement of the gasket from the position illustrated in Fig. 2 to that shown in Fig. 3 must necessarily be accompanied by a stretching of the tubular portion 24 of the gasket since the effect is to expand the rectangular area defined by the closed length of the tubular portion of the gasket. Even though the required amount of such stretching of the tubular portion 24 is small and even though the material forming the gasket is resilient, the substantial cross-sectional area of the tubular portion 24 of the gasket resists such stretching with sufficient force that the tubular portion 24 adjacent the corners of the door will not be permitted to swing out away from the surface of the door and toward the door frame as desired. As a result the other portions of the gasket, having leaped out to the position shown in Fig. 3, will engage the surface of the door frame 30 and determine the closed position of the door, and the gasket near the corners of the door will fail to make contact with the door frame. Substantial air leakage follows, causing frosting of the refrigerator coils and excessive power consumption. It is with the elimination of this difficulty that the present invention is primarily concerned.

According to one embodiment of the invention the gasket 21 is distorted or deformed adjacent the corners thereof such that at the corners the tubular portion 24 of the gasket is arranged in the position illustrated in Fig. 3. To accomplish this the tubular portion 24 of the gasket is cut longer than the flange 22 with the result that when the corners of the gasket are assembled the tubular portion 24 bulges upwardly at the corners as illustrated in Figs. 4 and 5. It will be apparent upon inspection of Fig. 5 that when the straight portions of the gasket, at the left in Fig. 5, leap outwardly away from the refrigerator door and toward the door frame 30 under the influence of the magnets 25, such straight portions will then lie at substantially the same level as the corner portion since the latter portion is arranged in the raised position as a result of its having been distorted in the assembly of the gasket.

A jig is disclosed in Figs. 6 through 12 for assisting in the formation of a gasket which extends around substantially right-angle corners and is distorted at the corner portions in the manner specified above. The jig includes a base 31 which is preferably stationary. Pivotally mounted on the base 31 is a pair of plates 32 having arcuate tongues **32*a* extending downwardly into slots 31*a* in the base 31. Each plate 32** may be pivoted from the position shown in Fig. 6 through an angle of 45° to the position shown in Fig. 10.

Preferably, the plates 32 may be readily locked in any desired position within these limits by wing nuts 33. The wing nuts threadedly engage corresponding screws 34 which extend downwardly through the arcuate tongues **32*a* and into a second pair of slots 31*b* in the base 31 where the heads of the screws, not shown in the drawing, engage the base 31**.

Mounted on each plate 32 is a lower clamping member 35 best seen in Fig. 12. Corresponding upper clamping members 36, best seen in Fig. 11, are pivotally secured to the lower clamping members as by hinges 37. The upper clamping members 36 may be swung open as suggested in Fig. 9 to receive a length of the gasket 21 previously described. When the upper clamping members 36 are pivoted to their closed positions the corresponding upper and lower clamping members define an opening 38 extending therethrough so shaped as to receive the gasket 21 snugly. The upper clamping members may be locked in closed position by hook fasteners 39 seen in Fig. 8.

When the plates 32 are in the position illustrated in Figs. 6 through 9 the openings defined by two pairs of clamping members are aligned such that the clamping members may grip a common straight length of gasket as illustrated in Fig. 6. With a length of gasket so gripped by the clamping members a cutting instrument may readily be employed to cut a notch from the gasket, each edge of the notch lying at an angle of 45° to the longitudinal axis of the gasket. With the wedge-shaped section **21*a* so removed, it is possible to bend the gasket at that point at an angle of 90°. Subsequent to the removal of the wedge-shaped portion 21*a* of the gasket the thumb screws 33 may be loosened and the plates 32** pivoted to the position illustrated in Fig. 10. This brings the severed ends or edges of the gasket together, in which position these edges may be conveniently joined by a heat sealing process or by the use of a suitable adhesive.

In accordance with the invention the openings 38 defined by the respective pairs of clamping members are so arranged as to effect, in the corner joint produced by the jig, the desired distortion or bulging of the tubular portion 24 of the gasket described above and illustrated in Fig. 5. This is accomplished by arranging the pairs of clamping members 35 and 36 to define an opening 38 which corresponds to the raised position of the gasket illustrated in Fig. 3. In effect then the tubular portion 24 of the gasket is cut longer than the flange 22, that is, if the gasket were removed from the clamping members after the cutting operation and the gasket permitted to assume its normal position illustrated in Fig. 2, it would be found that the flange 22 has been cut at a 45° angle while the opposed portion of the gasket, namely the tubular portion 24 and the horizontal portion of the leg member 23 as viewed in Fig. 2 would be found to have been cut at an angle appreciably greater or more obtuse than 45°. When two such severed edges are joined, the tubular portion 24 tends to bulge upwardly. It is most convenient to join the severed ends of the gasket while still held in the jig, in which case each severed end lies in a plane which extends at an angle of 45° to the longitudinal axis of the corresponding gasket portion, the severed ends of the tubular portion 24 already being arranged in their upwardly bent positions illustrated in Fig. 5.

The jig illustrated in Figs. 13 and 14 is another embodiment of the invention and is simpler than but lacks certain features of the first described machine. The simplified jig includes a base 41 and a pair of plates 42 adjustably secured thereto by screws 43 and 44. The two screws 43 adjacent the lower right-hand corner of the machine as viewed in Fig. 13 extend through suitable openings in the plates 42 and threadedly engage the base 41. The other two screws 44 holding the opposite ends of the plates 42 extend through slots 42*a* in the plates and threadedly engage the base 41. It will be apparent that by loosening the two screws 44 it is possible to pivot the plates about the screws 43 while the screws 44 traverse the slots 42*a*. The plates 42 may thereby be brought into the desired orientation with the base 41 after which the screws 44 may be tightened to hold the plates 42 in the desired positions.

Slidably mounted on each of the plates 42 is a gasket-holding member 45. Each of these members is guided by a slot 42*b* in the corresponding plate 42 and has projections at the lower surface thereof fitting snugly within these slots. One of these projections includes a screw 46 and a washer 47, the screw 46 being threadedly engaged with the gasket-holding member 45 while the washer 47 and the shank of the screw engage the sides of the slot 42*b*. The other of the two projections is the head 48 of a screw 49, the screw extending upwardly through the member 45 and being engaged by a wing nut. The two projections, comprising the screws 46 and 48 and the washer 47, guide each member 45 along the corresponding slot 42*b* while the wing nut 50 may be tightened to secure the corresponding member 45 in any desired position along the length of the slot.

Each of the members 45 has an opening 51 extending therethrough of such uniform cross-sectional contour as to receive a length of the gasket 21.

In operation a length of gasket is fed into the opening 51 in each of the members 45. One of the members 45, for example the right-hand member in Fig. 13, may then be moved toward the lower right-hand corner of the base 41 as viewed in Fig. 13 whereby the forward surface 45*a* of the gasket-holding member overlies a slot 41*a* in the base. The slot extends at an angle of 45° to the edges of the base 41 and the forward surface of the gasket-holding member 45 is aligned therewith. A suitable instrument such as a knife or saw may then be employed to sever the gasket along the forward surface 45*a* of the member 45, thereby cutting off a small portion 21*b* and leaving the severed edge of the gasket at an angle of 45° to its longitudinal axis.

The right-hand gasket-holding member 45 is then withdrawn from the slot 41*a* and the other member 45 brought to a corresponding position such that the end of the gasket held thereby may be removed. The two severed edges are then brought together by bringing both leading faces 45*a* of the gasket-holding members into abutment and the severed edges of the two lengths of gasket may be secured together by a heat sealing process or through the use of a suitable adhesive. If desired each of the gasket-holding members 45 may comprise two clamping members pivotally connected as by hinges, not shown in the drawings, similar to the arrangement of the machine disclosed in Figs. 6 through 12.

In any event the cross-sectional configuration of the openings 51 defined by the gasket-holding members 45 corresponds to that position of the gasket illustrated in Fig. 3. The tubular portion 24 of the gasket will then be distorted at and near the corner of the gasket assembly as illustrated in Fig. 5 for the reasons explained in detail above.

It will be noted that in the machine disclosed in Figs. 13 and 14 it is intended that the gasket be severed entirely across its width and that the two severed edges be brought together to form a right-angle corner joint. The machine disclosed in Figs. 6 through 12 is arranged such that a wedge-shaped section 21*a* may be removed from a continuous length of gasket, with the outer wall, comprising the vertical section of the interconnecting member 23 as viewed in Fig. 2, remaining intact. This latter outer wall may, of course, be bent readily to an angle of 90° whereby the severed ends of the gasket are brought together. It will be obvious to those skilled in the art that the machine disclosed in Figs. 6 through 12 may readily be arranged to permit the cut to extend clear across the width of the gasket after which the two completely severed ends of the gasket may be brought together to form a right-angle corner. It will also be obvious that where a corner joint is desired whose angle is other than 90°, either of the disclosed machines, or their designs, may readily be adjusted to facilitate the formation of such a corner joint.

Both of the machines disclosed facilitate the formation of a corner joint in a gasket in which the tubular portion 24 of the gasket is distorted upwardly to a desired degree. In each case this is accomplished by arranging the jig to hold the gasket in such a distorted position during the cutting and joining of the gasket. It is within the scope of the invention of course, to exaggerate or reduce the distortion of the gasket to obtain any desired degree of bulging at the corners thereof.

It will be apparent that the invention may be varied in its physical embodiments without departing from the spirit of the invention, and it is desired, therefore, that the invention be limited only by the scope of the appended claims.

The invention having thus been described, what is claimed and desired to be secured by Letters Patent is:

1. A gasket of the character described having a corner joint, the sealing edge of said gasket adjacent said corner being arranged outwardly of the member on which said gasket is mounted with respect to the normal position of the remainder of the sealing edge of said gasket.

2. A gasket of the character described having a corner joint, the sealing edge of said gasket adjacent said corner being arranged outwardly of the member on which said gasket is mounted with respect to the normal position of the remainder of the sealing edge of said gasket, whereby the entire sealing edge of said gasket lies substantially in a common plane when said remainder of said gasket is moved outwardly of said member.

3. A gasket for sealing a joint between a door jamb member and a door member pivotally secured to said first-mentioned member, said gasket having one longitudinally extending portion secured to one of said members and a second longitudinally extending portion resiliently movable a limited distance away from said one member toward said other member, said second portion of said gasket having a sealing edge for contacting said other member, said gasket extending continuously around at least one substantially right-angle corner, magnetic means located within said second portion of said gasket and arranged along the length thereof, magnetic means located on the other of said members in a position adjacent said gasket when said door member is closed, at least one of said magnetic means comprising a source of magnetic flux whereby said magnetic means are mutually attracted when said door member is near its closed position, said mutual attraction causing the major part of said second portion of said gasket to move resiliently outwardly toward said other member when said door member approaches closed position, the corner sections of said gasket being distorted whereby the sealing edge of said second portion of said gasket adjacent said corners lies normally in substantially the same plane as the remainder of said second portion of said gasket when said remainder of said portion is so moved resiliently outwardly by said magnetic means.

4. A gasket for sealing a joint between a door jamb member and a door member pivotally secured to said first-mentioned member, said gasket having one longitudinally extending portion secured to one of said members and a second longitudinally extending portion resiliently movable a limited distance away from said one member toward said other member, said second portion of said gasket having a sealing edge for contacting said other member, said gasket extending continuously around at least one corner, magnetic means associated with said second portion of said gasket and arranged along the length thereof, magnetic means associated with the other of said members in a position adjacent said gasket when said door member is closed, at least one of said magnetic means comprising a source of magnetic flux whereby when said door member is near its closed position said magnetic means are mutually attracted and said sealing edge of said gasket except those sections thereof adjacent said corner is caused to move resiliently outwardly toward said other member, the corner sections of said gasket being permanently distorted such that the sealing edge of said gasket adjacent said corners is disposed outwardly of said one member and toward said other member with respect to the normal position of the remainder of said sealing edge.

5. A gasket for sealing a joint between a door jamb member and a door member pivotally secured to said first-mentioned member, said gasket having one longitudinally extending portion secured to one of said members and a second longitudinally extending portion resiliently movable a limited distance away from said one member toward said other member, said second portion of said gasket having a sealing edge for contacting said other member, said gasket extending continuously around at least one corner, magnetic means associated with said second portion of said gasket and arranged along the length thereof, magnetic means associated with the other of said members in a position adjacent said gasket when said door member is closed, at least one of said magnetic means comprising a source of magnetic flux whereby when said door member is near its closed position said magnetic means are mutually attracted and said sealing edge of said gasket except those sections thereof adjacent said corner is caused to move resiliently outwardly toward said other member, the corner sections of said gasket being permanently distorted such that the sealing edge of said gasket adjacent said corners lies normally in substantially the same plane as the remainder of said sealing edge of said gasket when said remainder of said sealing edge is so moved resiliently outwardly by said magnetic means.

6. The method of forming a corner joint in a flexible gasket, such gasket being adapted to seal a joint between two relatively movable members and having a base portion for securing to one of said members and a sealing edge resiliently movable away from said base portion and said one member and toward the other of said members, said method comprising forming bevelled ends on separate lengths of said gasket, joining such bevelled ends together to form a corner, and forcibly maintaining said sealing edge away from said base portion during such formation and joining of bevelled ends whereby the sealing edge of the gasket adjacent the corner so formed is arranged away from said base portion with respect to its normal position.

7. The method of forming a corner joint in a flexible magnetic gasket, such gasket being adapted to seal a joint between two relatively movable members and having a base portion for securing to one of said members and a sealing edge resiliently movable under the influence of magnetic attraction away from said base portion and said one member and toward the other of said members, said method comprising forming bevelled ends on separate lengths of said gasket, joining such bevelled ends together to form a corner, and forcibly maintaining said sealing edge away from said base portion during such formation and joining of bevelled ends whereby the sealing edge of the gasket adjacent the corner so formed is arranged away from said base portion with respect to its normal position.

References Cited in the file of this patent

UNITED STATES PATENTS

| | | |
|---|---|---|
| 1,873,460 | Newton | Aug. 23, 1932 |
| 2,108,988 | Longley | Feb. 22, 1938 |
| 2,132,583 | Skogsberg | Oct. 11, 1938 |
| 2,149,882 | Clements | Mar. 7, 1939 |
| 2,201,669 | Kraft | May 21, 1940 |
| 2,273,463 | Campbell | Feb. 17, 1942 |
| 2,278,756 | Wright | Apr. 7, 1942 |
| 2,344,575 | Warren | Mar. 21, 1944 |
| 2,364,962 | Eagles | Dec. 12, 1944 |
| 2,446,336 | Mark et al. | Aug. 3, 1948 |
| 2,471,635 | Mark et al. | May 31, 1949 |
| 2,503,882 | Medford | Apr. 11, 1950 |
| 2,516,602 | Snyder | July 25, 1950 |
| 2,552,148 | Carson | May 8, 1951 |
| 2,575,798 | Dain | Nov. 20, 1951 |
| 2,603,843 | Hill | July 22, 1952 |